Jan. 31, 1928.
M. W. MOESTA
1,657,480
DOOR CONSTRUCTION
Original Filed July 27, 1925
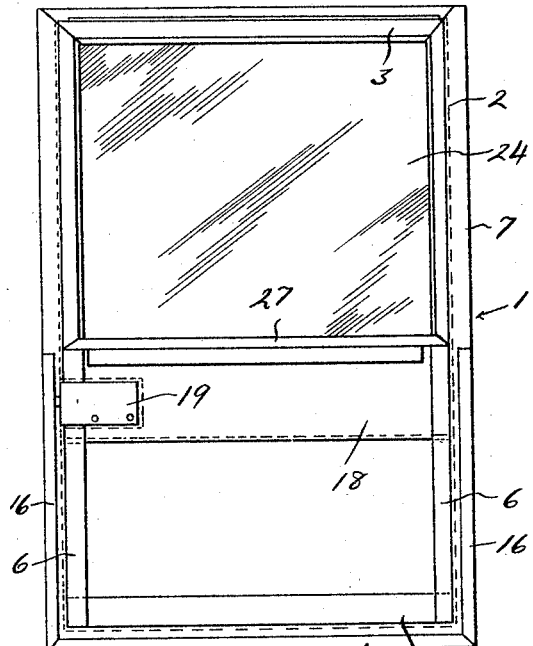
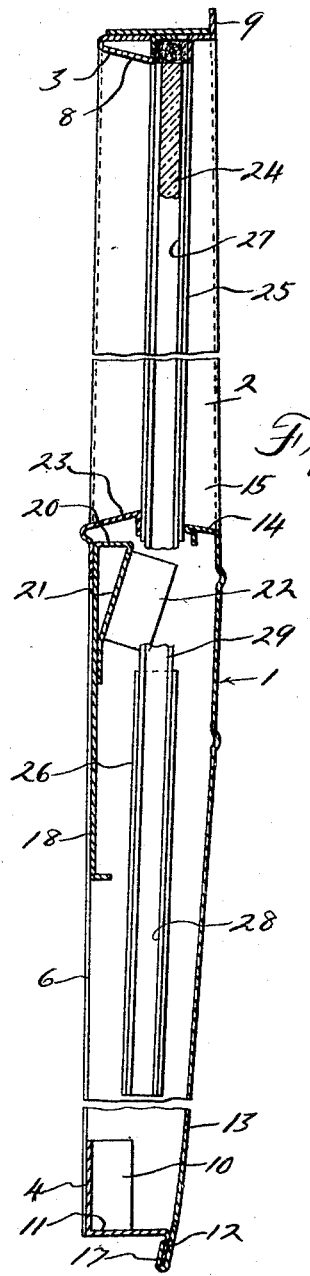
Inventor
Marvin W. Moesta
By Whittemore Hulbert
Whittemore & Belknap
Attorneys Patented Jan. 31, 1928.

1,657,480

UNITED STATES PATENT OFFICE.

MARVIN W. MOESTA, OF DETROIT, MICHIGAN, ASSIGNOR TO MURRAY CORPORATION OF AMERICA, OF DETROIT, MICHIGAN, A CORPORATION OF MICHIGAN.

DOOR CONSTRUCTION.

Original application filed July 27, 1925, Serial No. 46,470. Divided and this application filed May 2, 1927. Serial No. 188,212.

This invention relates generally to door constructions, particularly to all metal door constructions for vehicle bodies and consists of certain novel features of construction, combinations and arrangements of parts as will be more fully described and particularly pointed out in the appended claims.

This invention is a division of application Serial Number 46,470, filed July 27, 1925, for door construction.

Referring now to the drawings:

Figure 1 is an elevation of the inner side of the door;

Figure 2 is a vertical section through the door.

Referring now to the drawings, the numeral 1 designates a door embodying my invention having a rectangular frame comprising the upright members 2 and cross bars 3 and 4 respectively. As shown, the upright members 2 constitute door pillars and are preferably provided at their inner and outer edges with oppositely extending flanges 6 and 7 respectively. The upper cross bar 3 of the frame constitutes a reinforcing member and is preferably provided at its forward and rear edges with the oppositely extending flanges 8 and 9 respectively. To provide a neat joint, the opposite ends of this cross bar 3 and the upper ends of the pillars 2 are preferably mitred and are welded together as shown in Figure 1 of the drawings. The lower cross bar 4 also constitutes a reinforcing member and is preferably welded at its opposite ends to the flanges 6 of the pillars. To provide a strong connection, this bar 4 is preferably provided at its opposite ends with lateral inwardly extending flanges 10 which are preferably welded to the inner faces of the pillars 2. As shown in Figure 2 of the drawings, this lower cross bar 4 is also preferably provided at its lower edge with a horizontal inwardly extending flange 11 having at its inner edge a depending flange 12 which preferably cooperates with the flanges 7 of the pillars to provide a U-shaped attaching frame for a suitable sheet metal panel 13. As shown, this panel 13 constitutes the exterior finish for the lower half of the door frame and is preferably provided at its upper edge with a return bent flange 14 that projects inwardly between the pillars 2 and constitutes a sill for a window opening 15. The panel 13 may be secured to the door frame in any suitable manner but is preferably provided at its side edges with flanges 16 which are return bent around and welded to the flanges 7 of the pillars and is provided at its lower edge with a flange 17 that is return bent around and welded to the depending flange 12 of the lower cross bar 4.

Located upon the inner side of the door frame, preferably opposite to the upper end of the outer panel 13, is a relatively narrow panel 18 which is preferably welded to the flanges 6 of the pillars. As shown, this panel 18 is adapted to support suitable lock mechanism 19 for the door and is preferably channel-shape in cross section. To provide a strong and durable construction, the upper flange 20 of the channel 18 is preferably provided at its inner edge with a depending apron 21 that is preferably offset slightly at its lower edge and is welded to the inner face of the inner panel 18. If desired, this apron 21 may be provided at its opposite ends with lateral flanges 22 that project inwardly and are preferably welded to the inner sides of the pillars 2. Thus this apron 21 cooperates with the panel 18 and flange 20 to form a transversely extending tube which will take up torsional strains and stresses to which the door may be subjected while in use.

In order that the door will have a neat appearance around the window opening 15, the depending flange 8 of the upper cross bar 3 and the lateral flanges 6 of the pillars are preferably bent inwardly as shown in Figure 2 of the drawings. Thus these bent flanges 6 and 9 respectively constitute finish strips and cooperate with a separate finish strip 23 secured to the panel 18 to provide a neat window frame. As will also be apparent, the finish strip 23 has the further function of entirely concealing the flange 20 and the apron 21 from view.

For closing the window opening 15 I preferably provide a sashless glass panel 24 that is adapted to be moved longitudinally of the door in suitable guides 25 and 26 respectively by suitable control mechanism (not shown). The upper guides 25 preferably extend from the depending flange 8 of the upper cross bar to the upper flange 20 of the inner panel 18 and have the bases 27 thereof welded to the inner faces of the pillars 2, while the lower guides 26 are preferably disposed below the flanges 22 of the apron 21 in alignment with the upper guides 25 and also have their bases 28 welded to the inner faces of the pillars 2. To protect the glass panel 24 and prevent the same from rattling I preferably provide suitable felt strips 29 that extend from the upper end of the upper guides 25 to the lower ends of the lower guides 26.

Thus from the foregoing description, it will be readily apparent that the door is provided with a full rigid frame that is materially reinforced intermediate its ends by the transversely extending tube. Hence I have provided an exceptionally strong and durable door which is capable of withstanding severe torsional strains and stresses. Inasmuch as the flange 8 and 6 respectively of the upper cross bar 3 and pillars 2 cooperate with the finish strip 23 to form the window frame, it will also be apparent that the time, labor and expense heretofore used to attach separate finish strips to the door pillars is saved. Hence the cost of manufacturing such doors has been reduced to a minimum.

While it is believed that from the foregoing description, the nature and advantages of the invention will be readily apparent. I desire to have it understood that I do not limit myself to what is herein shown and described, and that such changes may be resorted to when desired as fall within the scope of what is claimed.

What I claim as my invention is:

1. In a door, the combination with spaced pillars, of a channel shaped panel secured to said pillars having an apron connecting one flange of the channel to the inner face of the panel and forming a tube, and flanges projecting from the apron secured to the pillars.

2. In a door, the combination with spaced pillars, of a panel secured thereto having an inwardly extending flange, and a depending apron cooperating with said panel and flange to form a transversely extending tube.

3. In a door, the combination with spaced pillars, of a panel secured thereto, said panel being provided at one end thereof with an open return-bent portion forming therewith a transversely extending tube.

4. In a door, the combination with spaced pillars, of a panel secured thereto, said panel being provided at one end thereof with an open return-bent portion cooperating therewith to form a transversely extending tube, and a finish strip secured to the outer wall of said panel and overlying and concealing said transverse tube.

5. In a door, the combination with spaced pillars, of a panel secured thereto, said panel being provided at one end thereof with an open return-bent portion cooperating therewith to form a transversely extending tube, and a finish strip extending between said pillars and overlying and concealing said transverse tube.

6. In a door, the combination with spaced pillars, of a panel secured thereto, said panel being provided at one end thereof with an open return-bent portion cooperating therewith to form a transversely extending tube, a finish strip spaced from and overlying said tube, and a flange extending from an edge of said finish strip and secured to said panel.

In testimony whereof I affix my signature.

MARVIN W. MOESTA.